United States Patent [19]
Hoekstra

[11] Patent Number: 4,730,489
[45] Date of Patent: Mar. 15, 1988

[54] VARIABLE LEVEL CAPACITOR SENSOR

[75] Inventor: Linze Hoekstra, Ede, Netherlands

[73] Assignee: Mutech Holland B.V., Arnhem, Netherlands

[21] Appl. No.: 925,817

[22] Filed: Oct. 30, 1986

[51] Int. Cl.$^4$ .............................................. G01F 23/26
[52] U.S. Cl. ................................. 73/304 C; 324/61 R; 361/284
[58] Field of Search ....................... 73/304 C; 361/284

[56] References Cited

U.S. PATENT DOCUMENTS

| | | | |
|---|---|---|---|
| 2,741,124 | 4/1956 | Meyers | 73/304 C |
| 2,752,543 | 6/1956 | Smith | 361/284 |
| 2,950,426 | 8/1960 | Frome | 361/284 |

*Primary Examiner*—Daniel M. Yasich
*Attorney, Agent, or Firm*—Rosen, Dainow & Jacobs

[57] ABSTRACT

Sensor for an apparatus for measuring the level and/or the quantity of a liquid medium in a vessel, for example a pressure vessel, provided with a carrier which may be mounted in the wall of the vessel, a first pipe fastened to the carrier and a second pipe positioned concentrically and insulated within the first pipe, which second pipe may be connected through a bushing member positioned in the carrier, wherein a conductor is wound at least locally on the first pipe, which conductor is insulated with respect to the first pipe and may be connected through a bushing member positioned in the carrier.

9 Claims, 2 Drawing Figures

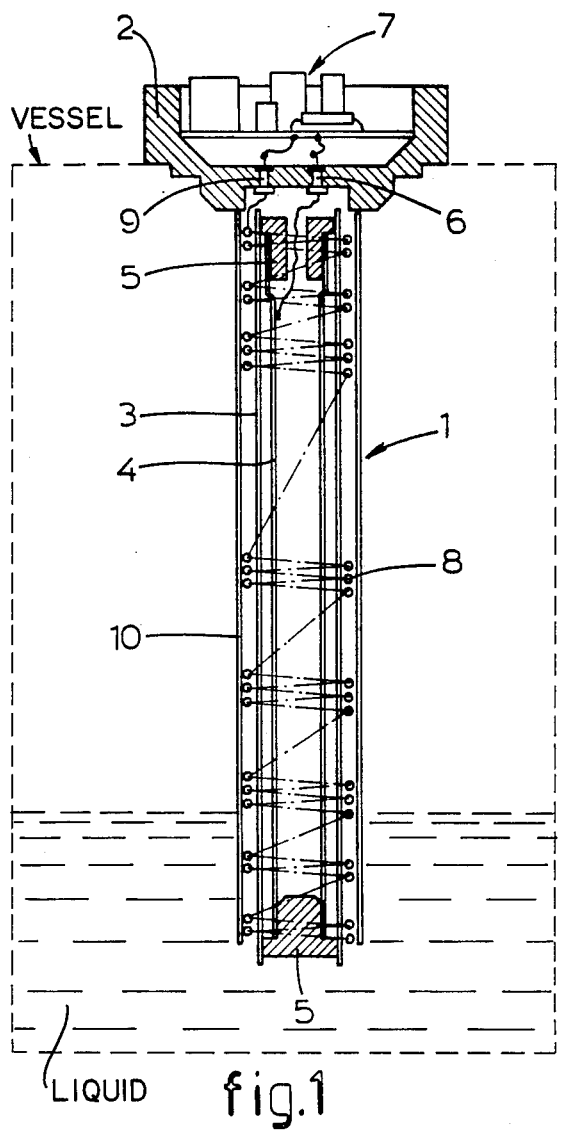
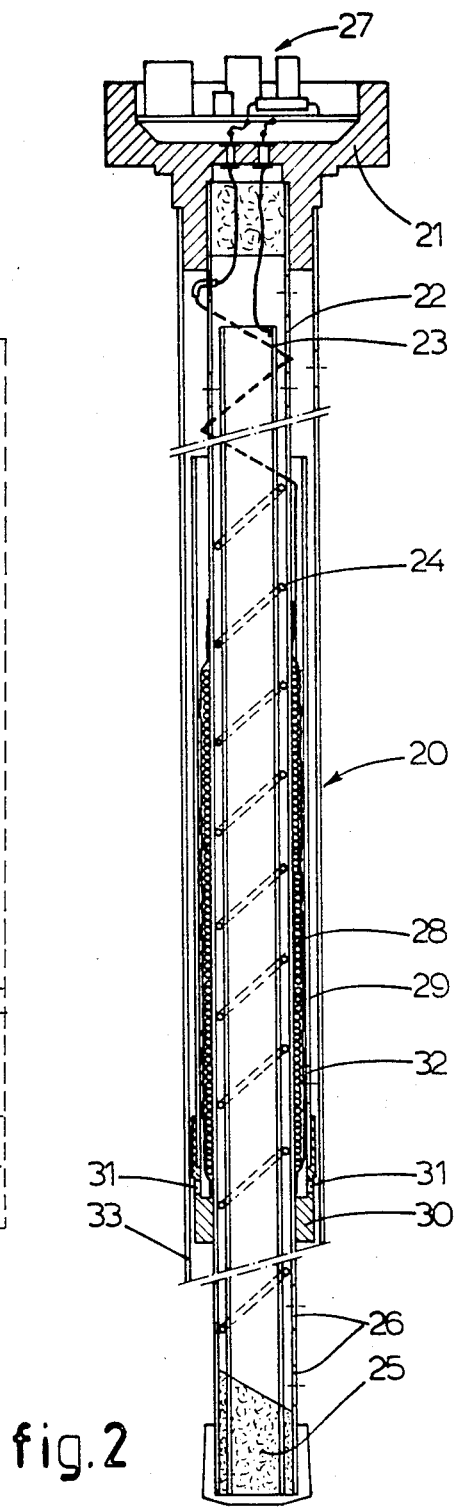
fig.1
fig.2

VARIABLE LEVEL CAPACITOR SENSOR

BACKGROUND OF THE INVENTION

The invention relates to a sensor for an apparatus for measuring the level and/or the quantity of a liquid medium in a vessel, for example a pressure vessel, provided with a carrier which may be mounted in the wall of the vessel, a first pipe fastened to the carrier and a second pipe positioned concentrically and insulated within the first pipe, which second pipe may be connected through a bushing member positioned in the carrier.

A sensor of this type may for example be applied for measuring the level in a pressure vessel for liquid gas in a motor car. The two pipes together form a capcitor, of which the capacity value is dependent on the presence of the liquid gas between the two pipes. By means of an electronic circuit the level or the quantity of gas which is still present in the pressure vessel may be determined on the basis of the capacity value, so that the supply of fuel may be indicated to the user.

It is also possible to apply a sensor of this kind for determining the level and/or the quantity of the liquid gas in a storage tank with a fuelling station. Although the known sensor in practice functions satisfactorily for the application in a fuel tank, the accuracy for application in storage tanks may leave much to be desired, whereas with such applications it is moreover desirable to obtain a clear signalling at certain levels.

SUMMARY OF THE INVENTION

It is an object of the invention to provide a sensor of the above-mentioned type, which is particularly suitable for application in storage tanks and the like.

For this purpose the sensor according to the invention is characterized in that a conductor is wound at least locally on the first pipe, which conductor is insulated with respect to the first pipe and may be connected through a bushing member positioned in the carrier.

In this manner a second capacitor is obtained, by which with a varying level a larger capacity variation is attained, so that a more accurate measuring is possible. Moreover the windings of the insulated conductor can be applied on the first pipe exclusively at certain levels, so that a clear signalling of these levels is attained.

This clear level signalling is especially important with the application in storage tanks. In this case the filler valve should be closed at a filling of 90%, whereas at 85% filling a presignalling for closing the filler valve should be given. Furthermore with the sensor according to the invention it is possible to give a first warning signal at a filling of 30%, by which it is signalled to the user that it is necessary to order a new supply. Hereafter for example a second signal may be given at 20%, whereas at a filling of 10% the take-off valve can be closed.

BRIEF DESCRIPTION OF THE DRAWINGS

The invention will hereinafter be further elucidated with reference to the drawings, in which two embodiments are shown.

FIG. 1 shows schematically a first embodiment of the sensor according to the invention.

FIG. 2 shows schematically a second embodiment of the sensor according to the invention.

DESCRIPTION OF THE PREFERRED EMBODIMENTS

Referring to FIG. 1, there is shown a sensor 1 to be used in an apparatus for measuring the level and/or the quantity of a liquid medium in a vessel, for example for measuring the quantity of liquid gas in a supply tank. The sensor 1 is provided with a carrier 2 which may be mounted in the wall of the supply tank, a first pipe 3 fastened to the carrier 2 and a second pipe 4 positioned concentrically within the first pipe 3. This second pipe 4 is mounted in the first pipe 3 by means of two insulating centering caps 5. The two pipes 3, 4 consist of metal and together form a capacitor. The first pipe 3 is connected to mass (electrical around) by means of its fastening to the carrier 2, whereas the second pipe 4 may be connected to a schematically indicated electronic circuit 7 through a bushing member 6 positioned in the carrier 2. The bushing member 6 preferably consists of a so-called glass bushing, which has particularly favourable mechanical properties.

The capacity value of the capacitor formed by the two pipes 3, 4 is dependent on the level of the liquid gas in the supply tank, so that the electronic circuit 7 can in a simple manner determine the quantity of liquid gas present in the supply tank from this capacity value.

With the sensor shown an insulated conductor 8 is wound locally on the first pipe 3, which conductor may be connected to the electronic circuit 7 through a second bushing member 9 mounted in the carrier 2. The bushing member 9 preferably consists of a glass bushing. The local windings of the conductor 8 are obtained by winding the conductor with a variable pitch on the pipe 3. As an alternative it is also possible to wind the conductor with a fixed pitch on the pipe 3. In this case a second capacitor is obtained, by which the total capacity value is increased and a more accurate measuring is possible. The conductor 8 may also be connected to the bushing member 6 of the second pipe 4.

The local application of the windings of the conductor 8 have the advantage that in a particularly accurate way certain important levels of the liquid gas in the supply tank may be signalled. In the embodiment shown in the drawing, high pitch portions of windings have been provided successively at selected filling levels of, for examples, 6, 10, 20, 30, 60, 80, 85 and 90%, with the lowest level being at the bottom as indicated in FIG. 1. By this arrangement electronic circuit 7 receives a clear signalling of these various levels. At 85% for example a presignalling for closing the filler valve may be given, whereas at 90% the filler valve is automatically closed. Lower levels may be used to indicate that the stock of liquid gas has to be replenished, whereby at a certain minimum level of for example 10 or 6% the take-off valve is closed.

In order to prevent damage of the insulated conductor 8 a protection pipe 10 has been applied, which encloses the insulated conductor 8.

FIG. 2 shows a sensor 20, which mainly corresponds with the sensor 1 of FIG. 1. The sensor 20 is in particular to be used as measuring means for measuring the contents of a supply tank as for example liquid gas, with which a protection has been provided, which during filling when reaching a filling level of 90% closes the filler valve of the supply tank, so that no dangerous situations may arise.

The sensor 20 in the same manner as the sensor 1 is provided with a carrier 21, a first pipe 22 mounted in a central opening of the carrier 21 and a pipe 23 mounted concentrically in the first pipe 22. The second pipe 23 is centered with respect to the first pipe 22 and insulated by a wire 24 from plastic material helically fastened on the second pipe 23. The bottom end of the two pipes 22, 23 is cast into an epoxy material 25. In the bottom end of the first pipe 22 openings 26 are provided through which the liquid medium may enter the space between the two pipes 22, 23. The capacity value of the capacitor formed by the two pipes 22, 23 varies dependent on the level of the liquid medium in the supply tank and just as with the sensor 1 may be determined by an electronic circuit 27.

In order to avoid dangerous situations when filling the supply tank, it is necessary to stop the filling at a filling level of 90%. For this purpose at the height of this 90% filling level the sensor 20 is provided with a winding 28, which is mounted on the first pipe 22 and which is insulated with respect to this pipe 22. The winding 28 together with the pipe 22 forms a second capacitor, which is connected to a separate protection circuit of the electronic circuit 27.

The winding 28 is enclosed by a housing 29, which in the end 30 remote from the carrier 21 has a number of small openings 31. At some distance from the openings 31 in the direction of the carrier 21 one or more large openings 32 are provided. During filling the liquid medium when reaching the small openings 31 will first slowly penetrate in the space between the pipe 22 and the housing 29, by which the capacity value of the capacitor formed by the pipe 22 and the winding 28 slowly increases. However, as soon as the medium reaches the openings 32, the said space is rapidly filled, so that a rapid increase of the capacity value occurs, which is detected with certainty by the electronic circuit 27. The sharp increase of the capacity value means that the maximum filling level of 90% is attained and for the sake of safety the filler valve is automatically closed. This is attained even in the case of inattention of the operating people; therefore no overfilling of the supply tank is possible.

The second pipe 23 and the winding 28 are wound in the same manner as with the sensor 1 and connected with the circuit 27 through bushing members in the carrier 21. In this case the upper end of the pipe 22 is filled with an epoxy material.

For the protection of the sensor 20 a protection pipe 33 has been mounted around the unit.

The invention is not restricted to the embodiments described hereinbefore, which may be varied in several ways within the scope of the invention.

It is for example also possible to apply a non-insulated conductor instead of an insulated conductor. In this case between the pipe 3 and the conductor insulating means are provided, which for example are made as axially extending insulating ribs, which are fastened on the outside of the pipe 3.

Although in the drawing the conductor has been shown with a circular cross-section, the conductor may also be constructed as a conductive belt.

I claim:

1. A liquid level sensor for measuring the level and/or the quantity of a liquid medium in a vessel, comprising:
    a carrier, said carrier being adapted for mounting in the wall of said vessel;
    a first pipe of extended length fastened to said carrier, said first pipe being electrically conductive and serving as a capacitor electrode;
    a sprial winding of extended length of electrically conductive material, and spiral winding being concentric with said first pipe and electrically insulated therefrom, said winding forming the second electrode of a capacitor;
    connecting means for connecting said winding and said pipe to external circuitry,
    said spiral winding having a variable pitch along its length including alternately increasing and decreasing portions along the length of said spiral winding, the portions of said winding having increased pitch being located at preselected positions along the length of said spiral winding, the capacitance of said capacitor being subject to continuous increase when said sensor becomes progressively submerged lengthwise in said medium, said capacitance increasing in step-like fashion, that is, at a higher rate, when as the liquid level rises to and submerges said portions of said winding with higher pitch.

2. A sensor as claimed in claim 1, at further comprising a second conductive pipe positioned concentrically within and insulated from said first pipe, said first and second pipes forming a capacitor between them.

3. A sensor as claimed in claim 1 wherein at least one insulating bushing passes through said carrier, said winding having a connecting lead passing through one bushing, said second pipe having a lead connected through one bushing, said carrier being connected to said first pipe.

4. A sensor as claimed in claim 1, wherein a protection pipe surrounds said winding.

5. A sensor as claimed in claim 1, wherein the winding is connected to the same bushing as is said second pipe.

6. A sensor as claimed in claim 1, wherein insulating means is applied between said first pipe and said winding.

7. A sensor as claimed in claim 1, wherein said winding is constructed of an insulated conductor.

8. A sensor as claimed in claim 1, wherein said winding is belt shaped.

9. A liquid level sensor for measuring the level and/or the quantity of a liquid medium in a vessel, comprising:
    a carrier, said carrier being adapted for mounting in the wall of said vessel;
    a first pipe of extended length fastened to said carrier, said first pipe being electrically conductive and serving as a capacitor electrode;
    a spiral winding of extended length of electrically conductive material, said spiral winding being concentric with said first pipe and electrically insulated therefrom, said winding forming the second electrode of a capacitor;
    connecting means for connecting said winding and said pipe to external circuitry,
    said spiral winding having one high pitch portion along its length the portion of said winding having high pitch being located at a preselected position along the length of said spiral winding, the capacitance of said capacitor being subject to continuous increase when said sensor becomes progressively submerged lengthwise in said medium, said capacitance increasing in steplike fashion, that is, at a higher rate, as the liquid level rises to and submerges said portion of said winding with high pitch.

* * * * *